United States Patent [19]

Machida

[11] Patent Number: 4,883,710

[45] Date of Patent: Nov. 28, 1989

[54] MAGNETO-OPTICAL RECORDING MEDIUM

[75] Inventor: Hajime Machida, Tokyo, Japan

[73] Assignee: Ricoh Company, Ltd., Tokyo, Japan

[21] Appl. No.: 113,489

[22] Filed: Oct. 28, 1987

[30] Foreign Application Priority Data

Oct. 28, 1986 [JP] Japan ............... 61-256424
Oct. 28, 1986 [JP] Japan ............... 61-256425

[51] Int. Cl.$^4$ .......................... G11B 9/00
[52] U.S. Cl. ................... 428/336; 427/131;
428/694; 428/697; 428/701; 428/702; 428/900
[58] Field of Search ............ 428/694, 336, 697, 702, 428/701, 900; 365/122; 360/131–135; 369/13, 238; 430/945; 427/131

[56] References Cited

U.S. PATENT DOCUMENTS

| | | | |
|---|---|---|---|
| 4,544,602 | 10/1985 | Kobayashi et al. | 428/336 |
| 4,562,105 | 12/1985 | Machida et al. | 428/161 |
| 4,670,322 | 6/1987 | Nakamura et al. | 428/172 |
| 4,690,861 | 9/1987 | Nakamura et al. | 428/623 |
| 4,701,881 | 10/1987 | Tanaka et al. | 365/122 |

Primary Examiner—George F. Lesmes
Assistant Examiner—James B. Monroe
Attorney, Agent, or Firm—Oblon, Spivak, McClelland, Maier & Neustadt

[57] ABSTRACT

A magneto-optical recording medium is disclosed, which comprises a substrate, and a magnetic layer supported on the substrate, the magnetic layer comprising (1) a first magnetic layer comprising a magnetic oxide with perpendicular magnetic characteristics, having a saturation magnetization Ms of 100 Gauss or less and a coercive force $Hc_1$ of 1 KOe or less, and (2) a second magnetic layer comprising a magnetic oxide having a thermal conductivity $\chi$ of less than 0.3 cal/cm.sec.°C. and a light absorption coefficient $\alpha$ of $5 \times 10^3$ cm$^{-1}$ or more. This magneto-optical recording medium may further comprises an auxiliary production layer comprising a magnetic material, which is overlaid adjacent to the first magnetic layer.

16 Claims, 4 Drawing Sheets

Hw > Hc − Ho − Hd
(WHEN RECORDING)

He > Hc + Ho + Hd
(WHEN DELETING)

MAGNETO-OPTICAL RECORDING MEDIUM

BACKGROUND OF THE INVENTION

The present invention relates to a magneto-optical recording medium which is capable of performing over-write recording.

In recent years, considerable attention has been concentrated on magneto-optical recording materials for recording information therein by writing magnetic domains on a thin magnetic film thereof, utilizing the thermal effect of light, and for reading out the recorded information, therefrom by utilizing the magneto-optical effect thereof.

In the conventional magneto-optical recording, a laser beam modulation method is used in which a laser beam emitted from a semiconductor laser by inputting an information signal thereto is applied to a magneto-optical recording medium, and at the same time, a magnetic field is applied to the recording medium in the recording direction thereof, whereby thermal magnetic recording is performed. When the recorded information is deleted in this laser beam modulation method, a magnetic field for deletion (hereinafter referred to as "deleting magnetic field") is applied to the recording medium in the direction opposite to the direction at the time of recording, and at the same time, a laser beam is applied to the recording medium. This process will now be explained with reference to FIG. 1A. In a magneto-optical recording medium 33 which comprises a magnetic layer 13 shown in the figure, information A and information B (not shown) are recorded in the magnetic layer 13 with an area a of the magnetic layer 13 corresponding to information A and an area b of the magnetic layer 13 corresponding to information B being magnetized in the opposite direction. When information C and information d (not shown) are newly recorded in the magnetic layer 13, a recording magnetic field Hw is applied to the magnetic layer 13 in the recording direction thereof as shown in FIG. 1B, and at the same time, a laser beam 31 is applied pulse-wise to an area c of the magnetic layer 13 corresponding to information C and an area d of the magnetic layer 13 corresponding to information D of the magnetic layer 13. By this process, the magnetized directions of the areas c and d are reversed so that information C and information D are recorded.

However, information A and information C cannot be deleted simultaneously during the above-mentioned process. In order to delete information A and information B, it is necessary to heat the areas a and b by application of a laser beam thereto, and to apply a deleting magnetic field to the areas a and b in the direction opposite to the recording magnetic field Hw. However, in order to input information to the recording medium, with distinction between an information recording signal and an information deleting signal, it will be necessary to recognize the previously recorded bits and reverse the direction of the magnetic field in synchronization with the deleting signal. However, it will be extremely difficult to perform this in practice.

On the other hand, in a conventional recording method in which information is recorded in a magnetic recording medium by a magnetic head, an electric current for generating a magnetic field in a deleting direction is always input to the magnetic head, and an electric current for generating a magnetic field in an opposite direction is input to the magnetic head when recording information. Therefore, even if some information is already recorded in the recording medium, it is deleted whenever another information is newly recorded in the magnetic recording medium.

Thus, in the conventional magneto-optical recording method, over-write recording, that is, writing new information over already recorded information, is impossible, unlike the conventional magnetic recording. This is the shortcoming of the conventional magneto-optical recording method.

The inventors of the present invention previously proposed a magnetoplumbite hexagonal ferrite as a magnetic material for a magneto-optical recording medium. For example, in Japanese Laid-Open patent application No. 59-45644, a magnetoplumbite hexagonal ferrite with improved magneto-optical characteristics was proposed, which is represented by the following formula (I), in which part of Fe atoms is replaced by metal atoms other than Fe atoms:

$$AO \cdot n[M_xFe_{2-x}O_3] \qquad (I)$$

wherein A represents Ba, Sr, La or Ca; $5 \lesssim n \lesssim 6$; and M represents In, Sc, Ga, Rh, Cr, C, Co, Ni, Ti, Zn or Sn.

Since magnetoplumbite hexagonal ferrite itself is an oxide, it is neither oxidized nor corroded, and therefore is stable. Further, it has excellent magneto-optical characteristics. For instance, its Faraday effect can be used since it is highly transparent. However, magneto-plumbite hexagonal ferrite cannot readily be used as it is in a magneto-optical recording medium for over-write recording.

SUMMARY OF THE INVENTION

It is therefore an object of the present invention to provide a magneto-optical recording medium capable of easily performing over-write recording.

The object of the present invention is achieved by a magneto-optical recording medium comprising a substrate and a magnetic layer supported on the substrate, the magnetic layer comprising a first magnetic layer comprising a magnetic oxide with perpendicular magnetic characteristics, having a saturation magnetization of 100 Gauss or less and a coercive force $Hc_1$ of 1 KOe or more, and a second magnetic layer comprising a magnetic oxide having a thermal conductivity $X$ of less than 0.3 cal/cm sec °C. and a light absorption coefficient $\alpha$ of $5 \times 10^3$ cm$^{-1}$ or more.

Examples of a magnetic oxide for the first magnetic layer are (1) a magnetoplumbite hexagonal ferrite consisting of Fe and Me, in which Me is at least one element selected from the group consisting of Ba, Sr, Pb, La and Ca, and the Fe atoms are partly replaced by at least one element other than Fe atoms, and the atomic ratio of Fe to Me is 10~12: 1, (2) cobalt spinel ferrite, and (3) iron-garnet ferrite. Examples of a magnetic oxide for the second magnetic layer are cobalt spinel ferrite and nickel spinel ferrite.

The magneto-optical recording medium according to the present invention may further comprise an auxiliary reproduction layer having a large Faraday rotation angle ($\theta_F$) for the improvement of the reproduction C/N of the recording medium.

BRIEF DESCRIPTION OF THE DRAWINGS

In the drawings,

FIGS. 4 to 3 are schematic cross-sectional views of examples of a magneto-optical recording medium according to the present invention.

DETAILED DESCRIPTION OF THE PREFERRED EMBODIMENTS

The present invention will now be explained in detail with reference to the accompanying drawings.

Figure 1A:
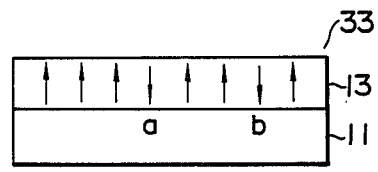
FIGS. 1A and 1B are diagrams in explanation of a conventional magneto-optical recording method.
Figure 1B:
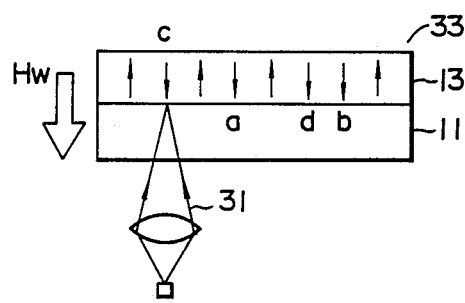
Figure 2A:
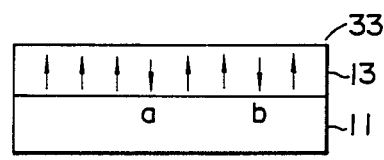
FIGS. 2A, 2B, 3A, 3B and 3C are diagrams in explanation of a magneto-optical recording method capable of performing over-write recording.
Figure 2B:
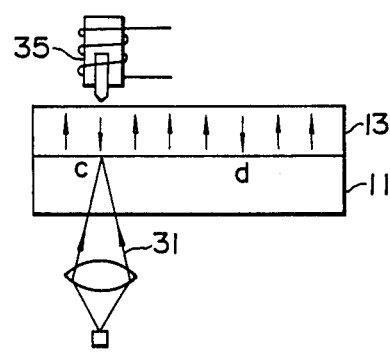

In order to make a magneto-optical recording medium capable of performing over-write recording, as illustrated in FIG. 2A and FIG. 2B, a laser beam 31 is continuously applied to a recording medium 33 in synchronism with a magnetic head 35 in a scanning manner from the right to the left in the case shown in these figures. At the same time, with the magnetic head 35 being constantly caused to generate a magnetic field He in the deleting direction, a recording magnetic field Hw is caused to generate in the direction opposite to the direction of the deleting magnetic field He only at the time of recording information, whereby the recorded information A and information B which are respectively recorded in the area a and the area b are deleted, and new information C and new information D are instead recorded in the area c and the area d when the recording magnetic field Hw is generated by an information recording signal. Thus, over-write recording is can be performed in the same same manner as in the case of the conventional magnetic recording.

Figure 3A:
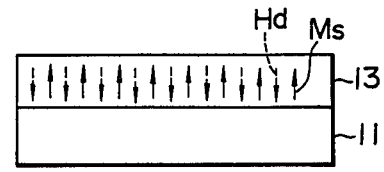
Figure 3B:
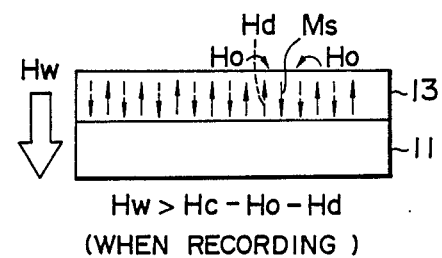
Figure 3C:
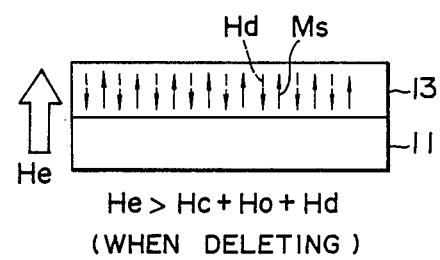

FIGS. 3A, 3B and 3C are the diagrams in explanation of the states of the magnetic field when recording information or deleting the same in a magnetic layer of a magneto-optical recording medium. As shown in FIG. 3A, when the recording medium is magnetized in the same one direction, the saturation magnetization Ms, the coercive force Hc, the anisotropic magnetic field Hk (Hk>4 $\pi$Ms), and the demagnetizing field Hd work within the magnetic layer. As shown in FIG. 3B, a recording magnetic field Hw is applied to the magnetic layer in the direction opposite to the magnetized direction of the magnetic layer during the recording of the information under the application of a laser beam thereto. At this moment, since the magnetizing direction of the demagnetizing field Hd within the magnetic layer is the same as the direction of the recording magnetic field Hw, both the Hd and the magnetic field from the peripheral portions (hereinafter referred to as the peripheral magnetic field Ho) act of the recording magnetic field Hw, so that the required recording magnetic field Hw is in the following relationship with the other magnetic fields including the coercive force Hc in terms of the intensity thereof: Hw>Hc−Ho−Hd.

On the other hand, when deleting the information, the relationship among the deleting magnetic field He, the coercive force Hc, the peripheral magnetic field Ho, and the demagnetizing field Hd is as follows because the direction of the deleting magnetic field He is opposite to the directions of the demagnetizing field Hd and the peripheral magnetic field Ho as shown in FIG. 3C: He>Hc+Ho+Hd.

Thus at the time of deleting, a magnetic field which is more intense by 2Ho+2Hd than that at the time of recording is required. Since the demagnetizing field Hd increases in proportion to 4 $\pi$Ms. the deletion becomes more difficult as the saturation magnetization Ms becomes large. Since a high frequency signal power is input to a magnetic head, it is difficult for the magnetic head to generate a strong magnetic field. Furthermore, it is required that the magnetic head be as small as possible in size. For these reasons, there is a demand for a magneto-optical recording material by which recording and deletion, in particular, deletion, can be performed with a minimum magnetic field.

However, for example, the Ms of magnetoplumbite hexagonal ferrite is generally large. More specifically, the Ms of $BaFe_{12}O_{13}$ is as large as about 380 Gauss, thus, the demagnetizing field thereof is also large.

Under these circumstances, in the present invention, a first magnetic layer made of a magnetic oxide having a small saturation magnetization, and a second magnetic layer made of a magnetic oxide having a large magneto-optical effect and capable of absorbing laser beams are used in combination, whereby a magneto-optical recording medium which attains over-write recording without difficulty and has excellent reproduction sensitivity and recording sensitivity is obtained.

More specifically, a magneto-optical recording medium according to the present invention comprises a substrate and a magnetic layer formed thereon, comprising a first magnetic layer comprising a magnetic oxide with perpendicular magnetic characteristics, having a saturation magnetization of 100 Gauss or less and a coercive force $Hc_1$ of 1 KOe or more, and a second magnetic layer comprising a magnetic oxide having a thermal conductivity $\times$ of less than 0.3 cal/cm sec °C. and a light absorption coefficient $\alpha$ of $5\times10^3$ cm$^{-1}$ or more.

Examples of a magnetic oxide for the first magnetic layer are (1) a magnetoplumbite hexagonal ferrite consisting of Fe and Me, in which Me is at least one element selected from the group consisting of Ba, Sr, Pb, La and Ca, and the Fe atoms are partly replaced by at least one element other than the Fe atoms, and the atomic ratio of Fe to Me is 10~12:1, (2) cobalt spinel ferrite, and (3) iron-garnet ferrite. Examples of a magnetic oxide for the second magnetic layer are cobalt spinel ferrite and nickel spinel ferrite.

The magneto-optical recording medium according to the present invention may further comprise an auxiliary reproduction layer having a large Faraday rotation angle ($\theta_F$) for the improvement of the reproduction C/N of the recording medium.

Figure 4:
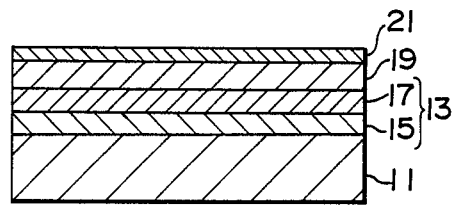

FIG. 4 is a schematic cross-sectional view of an example of a magneto-optical recording medium according to the present invention. This magneto-optical recording medium comprises a substrate 11 and a magnetic layer 13 formed on the substrate 11. The magnetic layer 13 consists of a second magnetic layer 15 and a first magnetic layer 17. On the magnetic layer 13, there are formed a heat insulating layer 19 and a reflection layer 21.

The first layer 17 mainly serves as a layer for recording information. More specifically, the first layer 17 is for writing, storing and deleting information. The first layer 17 is made of a magnetic oxide with perpendicular magnetic characteristics, having a saturation magnetization Ms of 100 Gauss or less and a coercive force $Hc_1$ of 1 KOe or more, for example, (1) a magnetoplumbite hexagonal ferrite, (2) cobalt spinel ferrite, or (3) iron-garnet ferrite as mentioned previously. In order that the first layer 17 attain the over-write recording, it is preferably that the saturation magnetization Ms by 100 Gauss or less, and in order that the first layer 17 magnetically record information and store the same in a stable manner, it is preferable that the coercive force Hc thereof by 1 KOe or more. For this reason, for example, when magnetoplumbite hexagonal ferrite is used in the first magnetic layer 17, it is preferable that at least one element selected from the group consisting of Al, Ga, Cr and Rh (hereinafter referred to as the first group element), which functions so as to decrease the saturation magnetization Ms and to increase the coercive force Hc, and at least one element selected from the group consisting of In, S, Zn, Ti, Nb, Se, Mo, G, Sb, Ta, Rh and W (hereinafter referred to as the second group element), which functions so as to significantly decrease the saturation magnetization Ms be employed. Further it is preferable that two or more $Fe^{3+}$ atoms be replaced by the first group element and not more than three $Fe^{3+}$ atoms be replaced by the second group element, and the substitution atomic ratio of the first group element of the second group element be more than 2, that is, as follows. (First Group Element)/(Second Group Element)>2.

As representative examples of such a magnetoplumbite hexagonal ferrite, the magnetoplumbite hexagonal ferrites having the following general formula can be given:

$$Me[Ma_x Mb_y Fe_{12-x-y}]O_{19} \quad (II)$$

wherein Me represents one element selected from the group consisting of Ba, Sr, Pb, Ca and La; Ma represents one element selected from the group consisting of Al, Ga, Cr and Rh; Mb represents one element selected from the group consisting of Ti, In, Sc and Zn; $2 \leq x \leq 6$; and $1 \leq y \leq 3$.

The constituent elements in the above formula may be replaced by other metal elements in order to improve the magneto-optical characteristics of the above magnetoplumbite hexagonal ferrites, or by such elements as Co, Ni, Cu, V, Ru, Ir, Sn, Ge, Pr and Bi for the charge compensation of the ferrites.

The above general formula (II) indicates that $Fe^{3+}$ atoms may be replaced by some metal elements other than $Fe^{3+}$ atoms so as to stoichiometrically compensate for the electric charge of $Fe^{3+}$ atoms. However, in a magnetoplumbite hexagonal ferrite film obtained in practice, the formulation does not always stoichiometrically correspond to the above formula. Rather, there is a case where the $Fe^{3+}$ atoms are replaced by some metal elements in such a manner that the electric charge $Fe^{3+}$ atoms is not stoichiometrically compensated for.

Nevertheless, the present invention covers such a case as well.

For improvement of the recording sensitivity, it is preferable to employ a magnetoplumbite hexagonal ferrite having a Curie temperature Tc of 300° C. or less.

The first magnetic layer 17 made of a magnetoplumbite is formed with a thickness ranging from 0.1 μm to 5 μm on a substrate by sputtering using a target with a predetermined composition.

The target is prepared, for instance, as follows. A mixture of $MeCO_2$ (where Me is at least one element selected from the group consisting of Ba, Sr, Pb, Ca and La), $Fe_2O_3$, a metal oxide of $Ma_xO_y$ (for example, $Al_2O_3$, $Ga_2O_3$, $Rh_2O_3$, and $Cr_2O_3$), and a metal oxide of $Mb_xO_y$ (for example, $In_2O_3$, ZnO, $TiO_2$, CoO, $Sc_2O_3$, MnO, $V_2O_5$, $WO_2$, $ZrO_2$, $Nb_2O_5$, $MoO_3$, $GeO_2$ and $SeO_2$) is added to a small amount of an aqueous solution of polyvinyl alcohol. The mixture is then placed in a metallic mold and pressed therein to form a solid mixture. The solid mixture is sintered in an electric furnace at 1000° C. to 1200° C. for 8 hours to form a solid composition. This solid composition is then ground to particles. The particles are pressed in a metallic mold to form a solid composition again. This solid composition is sintered in an electric furnace at 1200° C. to 1350° C. for 8 hours, whereby a target for sputtering is obtained. When spinel ferrite or iron garnet ferrite is employed in the first magnetic layer 17, a mixture of the corresponding metal oxides is sintered to prepare a target in the same manner as mentioned above.

The targets employed for forming the first magnetic layer 17 in the present invention are listed in Table 1 and the characteristics of the first magnetic layers formed by sputtering using those targets are shown in Table 2.

TABLE 1

| | Targets for First Magnetic Layers | |
|---|---|---|
| No. | Mixing Molar Ratios | Compositions of Sintered Targets |
| A-1 | $BaCO_3$, $1.5Al_2O_3$, $0.5In_2O_3$, $4Fe_2O_3$ | $Ba[Al_{3.0}In_{1.0}Fe_8]O_{19}$ |
| A-2 | $SrCO_3$, $1.5Al_2O_3$, $0.5In_2O_3$, $4Fe_2O_3$ | $Sr[Al_{3.0}In_{1.0}Fe_8]O_{19}$ |
| A-3 | $BaCO_3$, $1.5Al_2O_3$, $In_2O_3$, $3.5Fe_2O_3$ | $Ba[Al_{3.0}In_{2.0}Fe_7]O_{19}$ |
| A-4 | $BaCO_3$, $0.5CoO$, $0.5TiO_2$, $3.5Fe_2O_3$, $0.5In_2O_3$ | $Ba[Al_{3.0}In_{1.0}(Co_{0.5}Ti_{0.5})Fe_7]O_{19}$ |
| A-5 | $SrCO_3$, $1.5Ga_2O_3$, $0.5In_2O_3$, $4Fe_2O_3$ | $Sr[Ga_{3.0}In_{1.0}Fe_8]O_{19}$ |
| A-6 | $PbCO_3$, $1.5Ga_2O_3$, $0.5In_2O_3$, $4Fe_2O_3$ | $Pb[Ga_{3.0}In_{1.0}Fe_8]O_{19}$ |
| A-7 | $SrCO_3$, $1.5Ga_2O_3$, $0.5In_2O_3$, $0.5CoO$, $0.5TiO_2$, $3.5Fe_2O_3$ | $Sr[Ga_{3.0}In_{1.0}(Co_{0.5}Ti_{0.5})Fe_7]O_{19}$ |
| A-8 | $0.1BaCO_3$, $0.4La_2O_3$, $1.5Ga_2O_3$, $0.5Sc_2O_3$, $0.8CoO$, $3.5Fe_2O_3$ | $Ba_{0.2}La_{0.8}[Co_{0.8}Ga_{3.0}Sc_{1.0}Fe_7]O_{19}$ |
| A-9 | $0.8BaCO_3$, $0.2CaO$, $1.5Rh_2O_3$, $0.5In_2O_3$, $4Fe_2O_3$ | $Ba_{0.8}Ca_{0.2}[Rh_{3.0}In_{1.0}Fe_8]O_{19}$ |
| A-10 | $BaCO_3$, $1.5Al_2O_3$, $0.5Sc_2O_3$, $4Fe_2O_3$ | $Ba[Al_{3.0}Sc_{1.0}Fe_8]O_{19}$ |
| A-11 | $SrCO_3$, $1.5Rh_2O_3$, $0.5Sc_2O_3$, $0.5TiO_2$, $0.5CoO$, $3.5Fe_2O_3$ | $Sr[Rh_{3.0}Sc_{1.0}(Co_{0.5}Ti_{0.5})Fe_7]O_{19}$ |
| A-12 | $0.8Bi_2O_3$, $0.7Y_2O_3$, $0.5Ga_2O_3$, $2.0Te_2O_3$ | $Bi_{1.6}Y_{1.4}[Ga_{1.0}Te_{4.0}O_{12}]$ |
| A-13 | CoO, $0.3Cr_2O_3$, $0.7Fe_2O_3$ | $CoCr_{0.6}Fe_{1.4}O_3$ |

TABLE 2

| | Characteristics of First Magnetic Layers | | | |
|---|---|---|---|---|
| No. | Ms (Gauss) | Hc (KOe) | Tc (°C.) | Substrate |
| A-1 | 52 | 4.0 | 300 | Quartz glass |
| A-2 | 22 | 3.0 | 250 | Aluminosilicate glass |
| A-3 | 40 | 3.0 | 270 | Pyrex |
| A-4 | 15 | 5.0 | 320 | Vycor |
| A-5 | 95 | 2.0 | 280 | Crystallized glass |
| A-6 | 85 | 2.5 | 210 | $SiO_2$ coated stainless steel |
| A-7 | 87 | 2.0 | 240 | Soda glass |
| A-8 | 60 | 2.5 | 240 | Aluminosilicate glass |
| A-9 | 80 | 2.0 | 300 | Pyrex |
| A-10 | 30 | 2.0 | 280 | Aluminosilicate glass |
| A-11 | 50 | 2.0 | 300 | Aluminosilicate glass |
| A-12 | 30 | 1.0 | 500 | Corning 7059 |
| A-13 | 100 | 3.5 | 200 | $SiO_2$ coated stainless |

TABLE 2-continued

| | Characteristics of First Magnetic Layers | | | |
|---|---|---|---|---|
| No. | Ms (Gauss) | Hc (KOe) | Tc (°C.) | Substrate |
| | | | | steel |

The second magnetic layer 15 functions to reproduce the information stored in the first magnetic layer 17 and serves as a light absorbing layer at the time of recording. The second magnetic layer 15 comprises a magnetic oxide in which part of Fe atoms is replaced by Co atoms and, when necessary, further by other elements, in such a fashion that the coercive force $Hc_2$ thereof is smaller than the coercive force $Hc_1$ of the magnetic oxide in the first magnetic layer 17, that is, $Hc_2 < Hc_1$, the thermal conductivity $X$ is less than 0.3 cal/cm sec °C., that is $X < 0.3$ cal/cm sec °C., and the light absorption coefficient $\alpha$ is not less than $5 \times 10^3$ cm$^{-1}$, that is $\alpha \gtrsim 5 \times 10^3$ cm$^{-1}$.

The magnetic oxides for use in the first magnetic layer 17 have a small Faraday rotation angle because part of Fe atoms is replaced by other atoms and accordingly the number of $Fe^{3+}$ atoms which contribute to the increasing of Faraday rotation angle decreases. Therefore, the second magnetic layer 15 made of a magnetic oxide having a large magneto-optical recording effect (Faraday rotation) is combined with the first magnetic layer 17 so as to constitute the magnetic layer 13, whereby a large Faraday rotation angle $\theta_F$ is obtained and the reproduction C/N is improved.

Specific examples of a magnetic oxide for use in the second magnetic layer 15 are cobalt spinel ferrite and nickel spinel ferrite. When necessary, part of Fe atoms in these ferrites may be replaced by other elements such as Al, Cr, Mn, Ni, Zn, Ga, Si, Sc, In, Ti, V, Cu, W, Ge, Sb, Sn, Mg, Rh, Ru, Ca, Mo, Nb, Zr and $Co^{3+}$. Preferably 0.5 or more Fe atoms are replaced by at least one of the above-mentioned elements.

Cobalt spinel ferrites and nickel spinel ferrites for use in the present invention have the following general formulas (III) and (IV), respectively.

$$Co_xM_yFe_{3-(x+y)}O_4 \quad \text{(III)}$$

$$x \ y \ 3-(x+y)-4 \quad \text{(IV)}$$

wherein M represents one element selected from the group consisting of Al, Cr, Mn, Ni, Zn, Ga, Si, Sc, In, Ti, V, Cu, W, Ge, Sb, Sn, Mg, Rh, Ru, Ca, Mo, Nb, Zr and $Co^{3+}$; $0 < x < 2.0$; $0 < y < 2.5$; and $0 < x+y \leq 2.5$.

The above general formulas (III) and (IV) indicate that $Fe^{3+}$ atoms may be replaced by some metal elements other than $Fe^{3+}$ atoms so as to stoichiometrically compensate for the electric charge of $Fe^{3+}$ atoms. However, in a cobalt or nickel spinel ferrite film obtained in practice, the formulation does not always stoichiometrically correspond to the above formulas. Rather, there is a case where the $Fe^{3+}$ atoms are replaced by some metal elements in such a manner that the electric charge of $Fe^{3+}$ atoms is not stoichiometrically compensated for. Nevertheless, the present invention covers such a case as well as in the case of the magnetoplumbite hexagonal ferrite in the previously mentioned first magnetic layer 17.

The first magnetic layer 17 has high transparency to laser beams and therefore does not generate heat therein when laser beams are applied thereto for recording information or deleting the recorded information. Therefore a light absorbing layer for heating the first magnetic layer 17 is necessary. Therefore in the present invention, in order to provide the second magnetic layer 15 with the function of such a light absorbing layer as well, a particular oxide having a light absorbing coefficient $\alpha$ of $5 \times 10^3$ cm$^{-1}$ or less to the recording light, and a thermal conductivity of less than 0.3 cal/cm.sec.° C. is employed. It is preferable that the second magnetic layer 15 is designed to have such a thickness as to absorb 10 to 40% of the applied laser beams.

The second magnetic layer 15 made of a cobalt spinel ferrite or nickel spinel ferrite is formed with a thickness ranging from 0.1 μm to 0.5 μm by sputtering using a target with a predetermined composition.

The target is prepared, for instance, as follows. A mixture of CoO or NiO, $Fe_2O_3$ and $M_xO_y$ (where M indicates, for instance, an element selected from the group consisting of Al, Cr, Ga, Rh, In, Sc, V and Zn, and x and y each indicate the number of atoms.) is added to a small amount of an aqueous solution of polyvinyl alcohol. The mixture is then placed in a metallic mold and pressed therein to form a solid composition. The solid composition is sintered in an electric furnace at 1000° C. to 1400° C. for 8 hours, whereby the target is prepared. The Targets employed for forming the second magnetic layer 15 in the present invention are listed in Table 3 and the characteristics of the second magnetic layers formed by using those targets are shown in Table 4.

TABLE 3

| Targets for Second Magnetic Layers | | |
|---|---|---|
| No. | Mixing Molar Ratios | Compositions of Sintered Targets |
| B-1 | CoO, 0.65Al$_2$O$_3$, 0.35Fe$_2$O$_3$ | Co$_{1.0}$Al$_{1.3}$Fe$_{0.7}$O$_4$ |
| B-2 | 0.8CoO, 0.2ZnO, 0.5Al$_2$O$_3$, 0.5Fe$_2$O$_3$ | Co$_{0.8}$Zn$_{0.2}$Al$_{1.0}$Fe$_{1.0}$O$_4$ |
| B-3 | 0.8CoO, 0.2ZnO, 0.5Al$_2$O$_3$, 0.5Fe$_2$O$_3$ | Co$_{0.8}$Zn$_{0.2}$Al$_{1.0}$Fe$_{1.0}$O$_4$ |
| B-4 | CoO, 0.5Al$_2$O$_3$, 0.5Fe$_2$O$_3$ | Co$_{1.0}$Al$_{1.0}$Fe$_{1.0}$O$_4$ |
| B-5 | CoO, 0.65Cr$_2$O$_3$, 0.35Fe$_2$O$_3$ | Co$_{1.0}$Cr$_{1.3}$Fe$_{0.7}$O$_4$ |
| B-6 | CoO, 0.5Ga$_2$O$_3$, 0.5Fe$_2$O$_3$ | Co$_{1.0}$Ga$_{1.0}$Fe$_{1.0}$O$_4$ |
| B-7 | CoO, 0.65Rh$_2$O$_3$, 0.35Fe$_2$O$_3$ | Co$_{1.0}$Rh$_{1.3}$Fe$_{0.7}$O$_4$ |
| B-8 | CoO, 0.5In$_2$O$_3$, 0.5Fe$_2$O$_3$ | Co$_{1.0}$In$_{1.0}$Fe$_{1.0}$O$_4$ |
| B-9 | CoO, 0.5Sc$_2$O$_3$, 0.5Fe$_2$O$_3$ | Co$_{1.0}$Sc$_{1.0}$Fe$_{1.0}$O$_4$ |
| B-10 | CoO, 0.5V$_2$O$_3$, 0.5Fe$_2$O$_3$ | Co$_{1.0}$V$_{1.0}$Fe$_{1.0}$O$_4$ |
| B-11 | 0.5CoO, 0.5ZnO, 0.5Al$_2$O$_3$, 0.5Fe$_2$O$_3$ | Co$_{0.5}$Zn$_{0.5}$Al$_{1.0}$Fe$_{1.0}$O$_4$ |
| B-12 | 0.5CoO, 0.2NiO, 0.3ZrO, 0.5Al$_2$O$_3$, 0.5Fe$_2$O$_3$ | Co$_{0.5}$Ni$_{0.2}$Zn$_{0.3}$Al$_{1.0}$Fe$_{1.0}$O$_4$ |
| B-13 | 0.5CoO, 0.5ZnO, Fe$_2$O$_3$ | Co$_{0.5}$Zn$_{0.5}$Fe$_{2.0}$O$_4$ |
| B-14 | 0.7NiO, 0.3ZnO, Fe$_2$O$_3$ | Ni$_{0.7}$Zn$_{0.3}$Fe$_{2.0}$O$_4$ |
| B-15 | 0.5NiO, 0.5ZnO, Fe$_2$O$_3$ | Ni$_{0.5}$Zn$_{0.5}$Fe$_{2.0}$O$_4$ |
| B-16 | 0.3NiO, 0.7ZnO, Fe$_2$O$_3$ | Ni$_{0.3}$Zn$_{0.7}$Fe$_{2.0}$O$_4$ |
| B-17 | 0.5NiO, 0.5ZnO, 0.5Al$_2$O$_3$, 0.5Fe$_2$O$_3$ | Ni$_{0.5}$Zn$_{0.5}$Al$_{1.0}$Fe$_{1.0}$O$_4$ |

TABLE 3-continued

| | Targets for Second Magnetic Layers | |
|---|---|---|
| No. | Mixing Molar Ratios | Compositions of Sintered Targets |
| B-18 | 0.5NiO, 0.5ZnO, 0.5Cl$_2$O$_3$, 0.5Fe$_2$O$_3$ | Ni$_{0.5}$Zn$_{0.5}$Cr$_{1.0}$Fe$_{1.0}$O$_4$ |

TABLE 4

| | Characteristics of Second Magnetic Layer | | | |
|---|---|---|---|---|
| No. | Ms (Gauss) | Hc (KOe) | Tc (°C.) | $\alpha \times 10^4$ cm$^{-1}$ |
| B-1  | 40  | 300 | 180 | 2 |
| B-2  | 70  | 400 | 200 | 1 |
| B-3  | 25  | 200 | 160 | 1 |
| B-4  | 50  | 500 | 250 | 2 |
| B-5  | 90  | 500 | 160 | 4 |
| B-6  | 70  | 200 | 200 | 2 |
| B-7  | 70  | 400 | 210 | 2 |
| B-8  | 80  | 200 | 160 | 2 |
| B-9  | 80  | 200 | 180 | 2 |
| B-10 | 90  | 200 | 180 | 2 |
| B-11 | 120 | 50  | 220 | 1 |
| B-12 | 100 | 50  | 220 | 2 |
| B-13 | 200 | 100 | 300 | 1 |
| B-14 | 100 | 150 | 420 | 3 |
| B-15 | 200 | 180 | 280 | 1 |
| B-16 | 250 | 100 | 150 | 1 |
| B-17 | 70  | 300 | 230 | 1 |
| B-18 | 150 | 200 | 210 | 1 |

The cobalt spinel ferrite layer and nickel spinel ferrite layer work as an undercoat layer for the C-axis orientation of magnetoplumbite hexagonal ferrite. Therefore, in the magneto-optical recording medium as shown in FIG. 4, the second magnetic layer 15 works as the undercoat layer for the first magnetic layer 17 as well.

In order to increase the Faraday rotation angle ($\theta_F$) and improve the reproduction C/N, an auxiliary reproduction layer made of a magnetic material having a large Faraday rotation angle may also provided. It is preferably that the auxiliary reproduction layer be positioned adjacent to the first magnetic layer 17. When the substrate 11 is transparent, it is preferable that the auxiliary reproduction layer be formed on the substrate, then the first magnetic layer 17 be formed on the auxiliary reproduction layer, with the second magnetic layer 15 being formed on the first magnetic layer.

As the magnetic material for the auxiliary reproduction layer, a magnetic oxide having the following general formula (V) may be employed:

$$[R_3][M_xFe_{5-x}]O_{12} \quad (V)$$

wherein R represents an element having a larger ionic radius larger than that of Fe, for example, Y, Bi, Dy, Er, Ho, Yb, Lu, Nd, Pr, Sm, Eu, Gd, Tb and La; M represents an element having almost the same ionic radius as that of Fe, for example, Al, Ga, Ti, Zn, Ni and Co; and x is the substitution number for Fe, which is preferably in the range of $0 \leq x < 3$.

The above general formula (V) indicates that Fe$^{3+}$ atoms may be replaced by some metal elements other than Fe$^{3+}$ atoms so as to stoichiometrically compensate for the electric charge of Fe$^{3+}$ atoms. However, in an iron-garnet ferrite film obtained in practice, the formulation does not always stoichiometrically correspond to the above formula. Rather, there is a case where the Fe$^{3+}$ atoms are replaced by some metal elements in such a manner that the electric charge of Fe$^{3+}$ atoms is not stoichiometrically compensated for. Nevertheless, such a case is also within the scope of the present invention as in the case of the magnetoplumbite hexagonal ferrite in the previously mentioned first magnetic layer 17.

Specific examples of the above iron-garnet ferrite and the characteristics thereof will now be explained.

An auxiliary reproduction layer made of an iron-garnet ferrite is formed, preferably, with a thickness ranging from 0.1 μm to 1 μm by sputtering using a target with a predetermined composition or by vacuum deposition. The target is prepared, for instance, by mixing Fe$_2$O$_3$, a metal oxide represented by a formula of $R_xO_y$ (wherein the ionic radius of R is larger than that of Fe, for instance, Y, Bi, Gd, Tb, Yb and Sm; and x and y each represent the number of atoms), and a metal oxide represented by $M_xO_y$ (where M is a metal element having almost the same ionic radius as that of Fe, for instance, Al, Ga, Co and V; x and y each indicate the number of atoms), and sintering the mixture in an electric furnace at 1000° C. to 1300° C.

In addition, as the magnetic material for the auxiliary reproduction layer, a magnetic material having a Faraday rotation angle of 0.5 deg/μm or more may be used. Examples of such a magnetic such as CoO and NiO, and amorphous magnetic oxides containing Ni and/or Co.

The Targets employed for forming the auxiliary reproduction layer in the present invention are listed in Table 5 and the characteristics of the auxiliary reproduction layers formed by using those targets are shown in Table 6.

TABLE 5

| | Targets for Second Auxiliary Reproduction Layers | |
|---|---|---|
| No. | Mixing Molar Ratios | Compositions of Sintered Targets |
| C-1 | 0.9Bi$_2$O$_3$, 0.6Y$_2$O$_3$, 0.6Ga$_2$O$_3$, 1.9Fe$_2$O$_3$ | [Bi$_{1.8}$Y$_{1.2}$] [Ga$_{1.2}$Fe$_{3.8}$]O$_{12}$ |
| C-2 | 1.0Bi$_2$O$_3$, 0.5Gd$_2$O$_3$, 0.6Al$_2$O$_3$, 1.9Fe$_2$O$_3$ | [Bi$_{2.0}$Gd$_{1.0}$] [Al$_{1.2}$Fe$_{3.8}$]O$_{12}$ |
| C-3 | 0.5Bi$_2$O$_3$, 0.5Sm$_2$O$_3$, 0.5Yb$_2$O$_3$, 0.5CoO, 0.1V$_2$O$_5$, 1.9Fe$_2$O$_3$ | [Bi$_{1.0}$Sm$_{1.0}$Yb$_{1.0}$] [Co$_{0.8}$V$_{0.4}$Fe$_{3.8}$]O$_{12}$ |
| C-4 | 0.55Sm$_2$O$_3$, 1.0Yb$_2$O$_3$, 1.0CoO, 0.25V$_2$O$_5$, 1.75Fe$_2$O$_3$ | [Sm$_{1.1}$Yb$_{1.9}$] [Co$_{1.0}$V$_{0.5}$Fe$_{3.5}$]O$_{12}$ |
| C-5 | 0.5Bi$_2$O$_3$, 1.0Y$_2$O$_3$, 1.0CoO, 1.0GeO$_2$, 1.5Fe$_2$O$_3$ | [Bi$_{1.0}$Y$_{2.0}$] [Co$_{1.0}$Ge$_{1.0}$Fe$_{3.0}$]O$_{12}$ |
| C-6 | 0.2Bi$_2$O$_3$, 0.3Gd$_2$O$_3$, 1.0Y$_2$O$_3$, 0.6Ga$_2$O$_3$, 1.9Fe$_2$O$_3$ | [Bi$_{1.4}$Gd$_{0.6}$Y$_{1.0}$] [Ga$_{1.2}$Fe$_{3.8}$]O$_{12}$ |
| C-7 | 1.2Bi$_2$O$_3$, 0.3Dy$_2$O$_3$, 0.5Ga$_2$O$_3$, 2.0Fe$_2$O$_3$ | [Bi$_{2.4}$Dy$_{0.6}$] [Ga$_{1.0}$Fe$_{4.0}$]O$_{12}$ |

TABLE 6

| Characteristics of Auxiliary Reproduction Layers | | |
|---|---|---|
| No. | $\theta_F$ [Deg/μm] $\lambda$ = 780 nm | Hc (Oe) |
| C-1 | 0.7 | 50 |
| C-2 | 0.6 | 200 |
| C-3 | 1.0 | 100 |
| C-4 | 0.8 | 50 |
| C-5 | 1.4 | 100 |
| C-6 | 0.7 | 250 |
| C-7 | 1.0 | 200 |

The heat insulating layer 19 is a layer for preventing heat from diffusing into the reflection layer 21 when heated by the application of laser beams. The heat insulating layer 19 is made of a dielectric material such as SiO, $SiO_2$, $Si_xN_y$, $TiO_2$ and $ThO_2$.

The reflection layer 21 is a layer for reflecting laser beams therefrom for the detection of the Faraday rotation angle of the reflected laser beams. The reflection layer 21 is made of a metal such as Au, Ag, Pt, Nd, Cr, Rh, Cu and Al.

As the substrate 11, transparent substrates made of, for example, quartz glass, Vycor glass, aluminosilicate glass, Pyrex glass, borosilicate glass and crystallized glass (commercially available, for instance, with the trademarks of "Miracron PC-1" and "Miracron PP-1") can be employed.

When a magneto-optical recording medium is constructed in such a fashion that laser beams are applied to the side opposite to the substrate, an opaque substrate made of a material such as silicon wafer, stainless steel and alumina can be employed.

Figure 5:
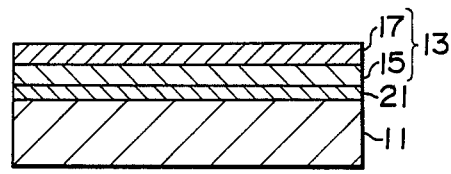

FIG. 5 is a schematical cross-sectional view of a magneto-optical recording medium having such a structure according to the present invention. In the figure, a reflection layer 21, a second magnetic layer 15 and a first magnetic layer 17 are successively overlaid on a substrate 11. In this structure, a transparent substrate can also be employed as the substrate 11.

Figure 6:
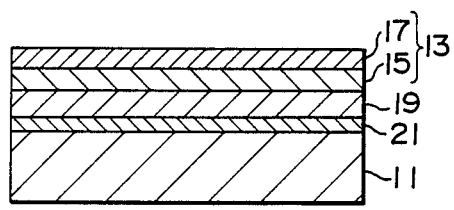

FIG. 6 is a schematic cross-sectional view of another magneto-optical recording medium according to the present invention, which comprises a reflection layer 21, a heat insulating layer 19, a second magnetic layer 15 and a first magnetic layer 17 which are successively overlaid on a substrate 11. The only difference between this magneto-optical recording medium and the magneto-optical recording medium shown in FIG. 5 is that the heat insulating layer 19 is interposed between the reflection layer 21 and the second magnetic layer 15 in this magneto-optical recording medium.

In general, a guide track is provided in the magneto-optical recording medium. The guide track may be provided in the form of a band-shaped groove on the substrate or in the form of a band on the reflection layer.

Figure 7:
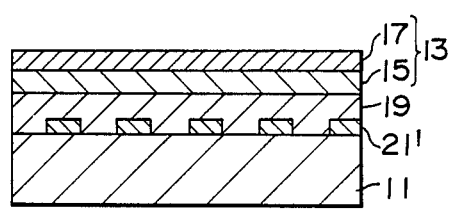

FIG. 7 is a schematic cross-sectional view of a magneto-optical recording medium having such a guide track according to the present invention. In the figure, a band-shaped reflection layer 21' is provided on a substrate 11, which reflection layer 21' serves as the guide track. On the reflected layer 21', there are successively overlaid a heat insulating layer 19, a second magnetic layer 15, and a first magnetic layer 17.

Figure 8:
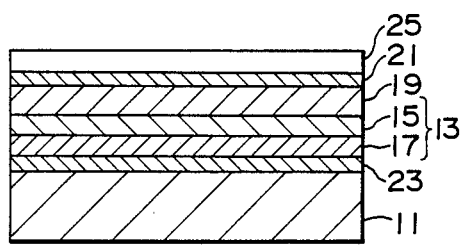

FIG. 8 is a schematic cross-sectional view of a further magneto-optical recording medium according to the present invention. In the figure, an undercoat layer 23, a first magnetic layer 17, a second magnetic layer 15, a heat insulating layer 19, a reflection layer 21 and a protective layer 25 are successively overlaid on a substrate 11. As in the magneto-optical recording medium shown in FIG. 4, the first magnetic layer 17 and the second magnetic layer 15 constitute a magnetic layer 13. As the material for the undercoat layer 23, ZnO, Ni-Zn ferrite, Mn-Zn ferrite and Co-Zn ferrite can be used. Further, as the material for the protective layer 25, dielectric materials, organic silicone and metal oxides can be employed.

As mentioned above, the first magnetic layer and the second magnetic layer are provided in the form of an integral combination. Regarding the overlaying order of the two magnetic layers with respect to the substrate, the first magnetic layer may come either on or under the second magnetic layer.

Figure 9:
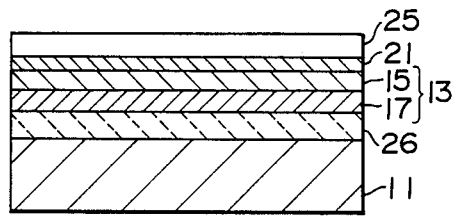

FIG. 9 is a schematic cross-sectional view of still another magneto-optical recording medium according to the present invention. In the figure, an auxiliary reproduction layer 26, a first magnetic layer 17, a second magnetic layer 15, a reflection layer 21 and a protective layer 25 are successively overlaid on a substrate 11.

Figure 10:
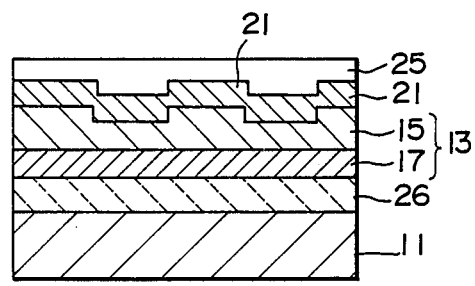

FIG. 10 is a schematic cross-sectional view of a still further magneto-optical recording medium according to the present invention. In the figure, an auxiliary reproduction layer 26, a first magnetic layer 17, a second magnetic layer 15 with grooves for a guide track, and a band-shaped reflection layer 21' and a protective layer 25 are successively overlaid on a substrate 11.

With reference to FIGS. 11 and 12A, 12B and 12C, an over-write procedure by use of a magneto-optical recording medium according to the present invention will now be explained.

Figure 11:
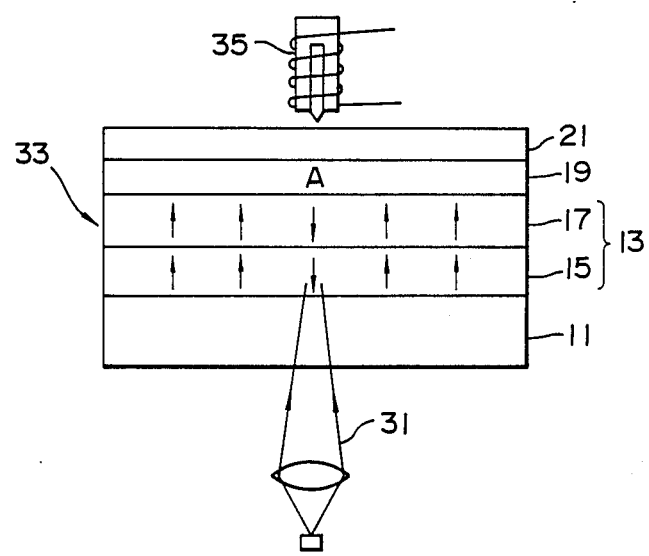

As shown in FIG. 11, a laser beam 31 is continuously applied to a magneto-optical recording medium 33 as the laser beam 31 is moved relative to the magneto-optical recording medium 33, whereby a magnetic layer 13 of the magneto-optical recording medium 33 is heated. Simultaneously, a magnetic head 35 is also moved in synchronization with the application of the laser beam 31 so as to apply a magnetic field to the portion of the magnetic layer to which the laser beam 31 is applied. An information signal current is caused to flow through the magnetic head 35. By changing the direction of the electric current flowing through the magnetic head 35, depending upon when generating an information recording signal or when generating an information deleting signal, the direction of the applied magnetic field is changed. In a normal state, an information deleting current flows through the magnetic head 35, so that, for instance, information A is deleted by the information deleting current. At the time of recording, an information recording current in the opposite direction to that of the information deleting current is caused to flow, so that a magnetic field in the opposite direction for recording is generated from the magnetic head 35.

Deletion of information A from the magnetic layer 13 will now be explained.

Figure 12A:
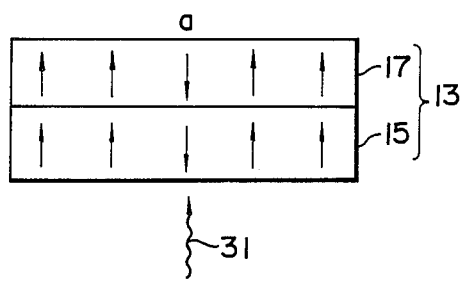
Figure 12B:
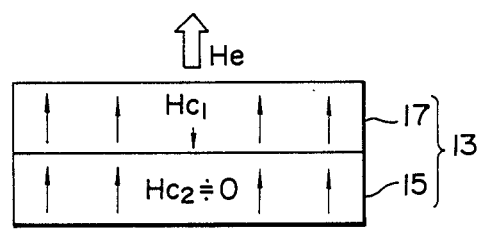
Figure 12C:
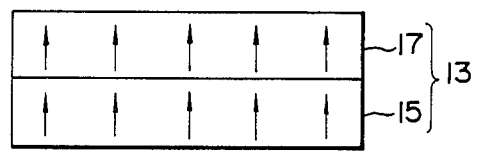

When a laser beam 31 is applied to a magnetic layer 13 shown in FIG. 12A, a second magnetic layer 15 absorbs the applied laser beam 31 so that heat is generated from the second magnetic layer 15. The heat is transferred to the first magnetic layer 17 by thermal conduction, so that the first magnetic layer 17 is heated. When the temperature of the first magnetic layer 17 is elevated to its Curie point Tc, the coercive force $Hc_1$ and the saturation magnetization Ms of the first magnetic layer 17 decrease. In the meantime, the temperature of the second magnetic layer 15 is elevated so as to exceed the Curie point $Tc_2$ thereof. The result is that the coercive force $Hc_2$ thereof and the saturation magentization Ms become nearly zero, that is, $Hc_2 \approx 0$, and $Ms \approx 0$, as shown in FIG. 12B. The magnetization direction of the first magnetic layer 17 is reversed by the deleting magnetic field He. When the first magnetic field 17 is cooled after recording, the opposite magnetization of the first magnetic layer 17 increases, and magnetic transfer to the second magnetic layer 15 is caused to occur by the magnetostatic combination. As a result, the magnetization of the magnetic layer 13 is reversed as shown in FIG. 12C. In this case, since the value of the saturation magnetization Ms of the first magnetic layer 17 is set to be relatively small, the magnetization of the first magnetic layer 17 can be reversed by a relatively small deleting magnetic field.

Recording (or writing of information) is performed in the same manner as that mentioned above except that a recording magnetic field having an opposite direction to that of the deleting magnetic field is employed.

In the above example, the material for the first magnetic layer, a representative example of which is magnetoplumbite hexagonal ferrite, has a higher Curie point than the material for the second magnetic layer, a representative example of which is cobalt spinel ferrite. Therefore, the case where $Tc_1$ is higher than $Tc_2$, that is, $Tc_1 > Tc_2$ has been explained in the above. However, the present invention is not limited to this case, but the first magnetic layer 17 may be heated to its Curie point.

The recorded information is stored in the first magnetic layer 17 in a stable manner since the coercive force Hc of the first magnetic layer is set at 1 KOe or more.

The reproduction (or reading out) of the recorded information (bits) is performed by applying a laser beam having a smaller power to the recording medium and detecting the Faraday rotation angle of the reflected light beam with the polarizing plane thereof being rotated in the magnetizing direction. At this moment, since the second magnetic layer 15 which has been subjected to magnetic transfer has a large magneto-optical effect, a high reproduction C/N can be obtained. The magnetization of the second magnetic layer can be maintained in a stable manner because the second magnetic layer is formed in the proximity of the first magnetic layer having a large coercive force.

With reference to the following examples, the present invention will now be explained in detail. These examples are given for illustration of the invention and are not intended to be limiting thereof.

EXAMPLE 1

Cobalt spinel ferrite No. B-1 in Table 3 was deposited by sputtering on a quartz glass substrate with a substrate temperature of 400° C., whereby a second magnetic layer having a thickness of 0.3 μm was formed on the quartz glass substrate.

Magnetoplumbite hexagonal ferrite No. A-1 in Table 1 was then deposited on the second magnetic layer by sputtering at a substrate temperature of 550° C., whereby a first magnetic layer having a thickness of 0.2 μm was formed.

SiO$_2$ was then deposited on the first magnetic layer by sputtering, whereby a heat insulating layer having a thickness of 0.5 μm was formed.

Further, Au was deposited by vacuum deposition with a thickness of 1000 Å on the heat insulating layer, whereby a reflection layer was formed on the heat insulating layer.

Thus, a magneto-optical recording medium No. 1 according to the present invention with a structure as shown in FIG. 4 was prepared.

EXAMPLE 2

Cobalt spinel ferrite No. B-2 in Table 3 was deposited on an aluminosilicate glass substrate, whereby a second magnetic layer having a thickness of 0.2 μm was formed on the aluminosilicate glass substrate.

Magnetoplumbite hexagonal ferrite No. A-2 in Table 1 was then deposited on the second magnetic layer, whereby a first magnetic layer having a thickness of 0.2 μm was formed.

Si$_3$N$_4$ was then deposited on the first magnetic layer, whereby a heat insulating layer having a thickness of 0.3 μm was formed.

Further, Cr was deposited on the heat insulating layer, whereby a reflection layer having a thickness of 0.1 μm was formed on the heat insulating layer.

Thus, a magneto-optical recording medium No. 2 according to the present invention with a structure as shown in FIG. 4 was prepared.

EXAMPLE 3

On a Pyrex substrate, the following reflection layer, second magnetic layer and first magnetic layer were successively overlaid in the same manner as in Example 1, whereby a magneto-optical recording medium No. 3 according to the present invention with a structure as shown in FIG. 5 was prepared:

| | |
|---|---|
| Reflection layer: | Pt (thickness 0.1 μm) |
| Second magnetic layer: | Cobalt spinel ferrite No. B-11 (thickness 0.5 μm) |
| First magnetic layer: | Magnetoplumbite hexagonal ferrite No. A-3 (thickness 0.2 μm) |

EXAMPLE 4

On a vycor glass substrate, the following undercoat layer, first magnetic layer, second magnetic layer, heat insulating layer, reflection layer and protective layer were successively overlaid, whereby a magneto-optical recording medium No. 4 according to the present invention with a structure as shown in FIG. 8 was prepared:

| | |
|---|---|
| Undercoat layer: | Ni$_{0.6}$Zn$_{0.4}$Fe$_{2.0}$O$_4$ (thickness 0.2 μm) |
| Firt magnetic layer: | Magnetoplumbite hexagonal ferrite No. A-4 (thickness 0.3 μm) |
| Second magnetic layer: | Cobalt spinel ferrite No. B-3 (thickness 0.5 μm) |
| Heat insulating layer: | SiO$_2$ (thickness 0.2 μm) |
| Reflection layer: | Al (thickness 0.1 μm) |
| Protective layer: | SiO$_2$ (thickness 0.1 μm) |

EXAMPLE 5

On a substrate made of a crystallized glass (Trademark "Miracron PC-1"), a reflection layer made of Cr was formed with a thickness of 0.1 μm. To this reflection layer, a photoresist was applied. The photoresist was subjected to overall contact exposure through a band-shaped guide mask and then developed. The Cr layer was etched to form a Cr guide track on the substrate.

A heat insulating layer was then formed with a thickness of 0.5 μm by spin coating of organosiloxane on the reflection layer with the guide track.

Cobalt spinel ferrite No. B-4 in Table 3 was deposited with a thickness of 0.8 μm by sputtering, whereby a second magnetic layer was formed on the reflection layer. Magnetoplumbite hexagonal ferrite No. A-5 in Table 3 was then deposited with a thickness of 0.2 μm, whereby a first magnetic layer was formed on the second magnetic layer. Thus, a magnetooptical recording medium No. 5 according to the present invention having a structure as shown in FIG. 7 was prepared.

EXAMPLE 6

On a stainless steel substrate coated with $SiO_2$ with a thickness of 0.5 μm, the following second magnetic layer, first magnetic layer, heat insulating layer and reflection layer were successively overlaid, whereby a magneto-optical recording medium No. 6 according to the present invention was prepared:

| | |
|---|---|
| Second magnetic layer: | Cobalt spinel ferrite No. B-5 (thickness 0.2 μm) |
| First magnetic layer: | Magnetoplumbite hexagonal ferrite No. A-6 (thickness 0.2 μm) |
| Heat insulating layer: | SiO (thickness 0.2 μm) |
| Reflection layer: | Pt (thickness 0.1 μm) |

The magneto-optical recording media No. 1 through No. 6 respectively obtained in Examples 1 through 6 were subjected to over-write recording by a magnetic head with an electric current with a frequency of 5 MHz being constantly caused to flow in the deleting direction. The intensity of the magnetic field was 500 Oe at the surface of each magneto-optical recording medium. As a laser for this recording, a semiconductor laser (λ=770 nm) was employed and a laser beam was applied to each recording medium in such a manner that the recording power at the surface of each recording medium was in the range of 5 to 5 mW. The over-write recording was performed with a bit size of 1 to 2 μm.

Each of the magneto-optical recording media No. 1 through No. 6 was subjected to a reproduction process, using a semiconductor laser (λ=780 nm), with a power of 1 to 2 mW. As a result, the reproduction C/N ratios ranging from 40 to 55 db (with a band of 30 MHz) were obtained.

EXAMPLES 7 to 19

Magneto-optical recording media No. 7 to 19 were prepared in accordance with the structures as shown in Table 7 by using a quartz glass substrate under the following conditions:

| | |
|---|---|
| Auxiliary production layer: | RF sputtering (Substrate temperature 500° C.) |
| First magnetic layer: | Counter-target sputtering (Subtrate temperature 600° C.) |
| Second magnetic layer: | RF sputtering (Substrate temperature 400° C.) |
| Heat insulating layer: | Electron beam vacuum deposition (Substrate temperature 400° C.) |
| Reflection layer: | Electron beam vacuum deposition (Substrate temperature 400° C.) |

These magneto-optical recording medium were subjected to the same over-write recording test as in Examples 1 through 6. The results are shown in Table 7.

TABLE 7

| Examples No. | Structure of the Recording Medium | | | | | Evaluation | |
|---|---|---|---|---|---|---|---|
| | Auxiliary Reproduction Layer | 1st Magnetic Layer | 2nd Magnetic Layer | Heat Insulating Layer | Reflection Layer | C/N (dB) | Recording Power (mW) |
| 7 | C-1 0.5 μm | A-1 0.3 μm | B-1 0.3 μm | $SiO_2$ 0.3 μm | Au 0.1 μm | 45 | 10 |
| 8 | C-2 0.3 μm | A-2 0.2 μm | B-2 0.2 μm | $SiO_2$ 0.5 μm | Pt 0.1 μm | 40 | 8 |
| 9 | C-3 0.5 μm | A-3 0.3 μm | B-3 0.3 μm | $ZrO_2$ 0.3 μm | Au 0.05 μm | 50 | 5 |
| 10 | C-4 0.7 μm | A-4 0.3 μm | B-4 0.2 μm | $Tb_2O_3$ 0.2 μm | Cr 0.1 μm | 45 | 7 |
| 11 | C-5 1.0 μm | A-5 0.5 μm | B-5 0.5 μm | $Cd_2O_2$ 0.3 μm | Al 0.2 μm | 55 | 12 |
| 12 | C-6 0.3 μm | A-6 0.2 μm | B-6 0.3 μm | $Nd_2O_2$ 0.5 μm | Cu 0.1 μm | 35 | 5 |
| 13 | C-7 0.5 μm | A-7 0.3 μm | B-7 0.2 μm | $SiO_2$ 0.5 μm | Ag 0.1 μm | 50 | 8 |
| 14 | C-1 0.3 μm | A-8 0.5 μm | B-8 0.3 μm | $HfO_3$ 0.3 μm | Rh 0.1 μm | 45 | 8 |
| 15 | C-2 0.3 μm | A-9 0.3 μm | B-9 0.2 μm | SiO 0.2 μm | Au 0.1 μm | 40 | 10 |
| 16 | C-3 0.5 μm | A-10 0.5 μm | B-10 0.3 μm | $SiO_2$ 0.3 μm | Pt 0.2 μm | 45 | 8 |
| 17 | C-4 1.0 μm | A-11 0.3 μm | B-11 0.5 μm | $Mn_3O_4$ 0.2 μm | Nd 0.1 μm | 45 | 10 |
| 18 | C-1 0.5 μm | A-1 0.3 μm | B-14 0.3 μm | $SiO_2$ 0.3 μm | Pt 0.1 μm | 45 | 10 |
| 19 | C-2 0.5 μm | A-4 0.3 μm | B-17 0.5 μm | $SiO_2$ 0.3 μm | Cr 0.1 μm | 35 | 7 |

According to the present invention, the magnetic layer of a magneto-optical recording medium is composed of the first magnetic layer and the second magnetic layer so as to assign a different function to each layer by using a particular magnetic oxide having a small saturation magnetization Ms and a large coercive force Hc in the first magnetic layer, and another magnetic oxide in the second magnetic layer so as to function as a light absorbing layer, whereby over-write recording is easily attained in the magneto-optical recording medium. In this recording medium, the recording is performed by the thermal conduction from the second magnetic layer to the first magnetic layer, and the recording sensitivity and reproduction sensitivity of the recording medium are improved by the magnetic transfer from the first magnetic layer to the second magnetic layer.

What is claimed is:

1. A magneto-optical recording medium comprising a substrate, and a magnetic layer supported on said substrate, said magnetic layer comprising:

a first magnetic layer comprising a magnetic oxide with perpendicular magnetic characteristics, having a saturation magnetization Ms of 100 Gauss or less and a coercive force $Hc_1$ of 1 KOe or more, and a second magnetic layer adjacent to said first magnetic layer comprising a magnetic oxide having a thermal conductivity x of less than 0.3 cal/cm.sec.°C. and a light absorption coefficient $\alpha$ of $5 \times 10^3$ cm$^{-1}$ or more.

2. The magneto-optical recording medium as claimed in claim 1, further comprising an auxiliary production layer comprising a magnetic material, which is directly adjacent to said first magnetic layer.

3. The magneto-optical recording medium as claimed in claim 1, wherein said magnetic oxide of said first magnetic layer is a magnetoplumbite hexagonal ferrite consisting of Fe and Me, in which Me is at least one element selected from the group consisting of Ba, Sr, Pb, La and Ca, and the Fe atoms are partly replaced by at least one element other than the Fe atoms, and the atomic ratio of Fe to Me is 10~12.

4. The magneto-optical recording medium as claimed in claim 1, wherein said magnetic oxide of said first magnetic layer is cobalt spinel ferrite.

5. The magneto-optical recording medium as claim in claim 1, wherein said magnetic oxide of said first magnetic layer is iron-garnet.

6. The magneto-optical recording medium as claim in claim 1, wherein said magnetic oxide of said second magnetic layer is cobalt spinel ferrite.

7. The magneto-optical recording medium as claimed in claim 1, wherein said magnetic oxide of said second magnetic layer is nickel spinel ferrite.

8. The magneto-optical recording medium as claimed in claim 1, wherein said magnetic oxide of said first magnetic layer is a magnetoplumbite hexagonal ferrite having formula, $$Me[Ma_xMb_yFe_{12-x-y}]O_{19}$$

wherein Me represents one element selected from the group consisting of Ba, Sr, Pb, Ca and La; Ma represents one element selected from the group consisting of Al, Ga, Cr and Rh; Mb represents one element selected from the group consisting of Ti, In, Sc and Zn; $2 \leq x \leq 6$; and $1 \leq y \leq 3$.

9. The magneto-optical recording medium as claimed in claim 1, wherein said first magnetic layer has a thickness ranging from 0.1 μm to 5 μm.

10. The magneto-optical recording medium as claimed in claim 1, wherein said magnetic oxide of said second magnetic layer has a coercive force $Hc_2$ which is smaller than the coercive force $Hc_1$ of said first magnetic layer.

11. The magneto-optical recording medium as claimed in claim 1, wherein said magnetic oxide of said second magnetic layer is a cobalt spinel ferrite having general formula, $$Co_xM_yFe_{3-(x+y)}O_4$$

wherein M represents one element selected from the group consisting of Al, Cr, Mn, Ni, Zn, Ga, Si, Sc, In, Ti, V, Cu, W, Ge, Sb, Sn, Mg, Rh, Ru, Ca, Mo, Nb, Zr and Co$^{3+}$; $0<x<2.0$; $0<y<2.5$; and $0<x+y \leq 2.5$.

12. The magneto-optical recording medium as claimed in claim 1, wherein said magnetic oxide of said second magnetic layer is a nickel spinel ferrite having general formula, $$Ni_xM_yFe_{3-(x+y)}O_4$$

wherein M represents one element selected from the group consisting of Al, Cr, Mn, Ni, Zn, Ga, Si, Sc, In, Ti, V, Cu, W, Ge, Sb, Sn, Mg, Rh, Ru, Ca, Mo, Nb, Zr and Co$^{3+}$; $0<x<2.0$; $0<y<2.5$; and $0<x+y \leq 2.5$.

13. The magneto-optical recording medium as claimed in claim 1, wherein said second magnetic layer has a thickness ranging from 0.1 μm to 0.5 μm.

14. The magneto-optical recording medium as claimed in claim 2, wherein said magnetic material of said auxiliary production layer has general formula, $$[R_3][M_xFe_{5-x}]O_{12}$$

wherein R represents an element having a larger ionic radius larger than that of Fe, M represents an element having almost the same ionic radius as that of Fe, and x is the substitution number for Fe in the range of $0 \leq x < 3$.

15. The magneto-optical recording medium as claimed in claim 14, wherein the element represented by R is selected from the group consisting of Y, Bi, Dy, Er, Ho, Yb, Lu, Nd, Pr, Sm, Eu, Gd, Tb and La, and the element represented by M is selected from the group consisting of Al, Ga, Ti, Zn, Ni and Co.

16. The magneto-optical recording medium as claimed in claim 1, wherein the first magnetic layer has a higher Curie point that the Curie point of said second magnetic layer.

* * * * *